United States Patent Office 3,165,122
Patented Jan. 12, 1965

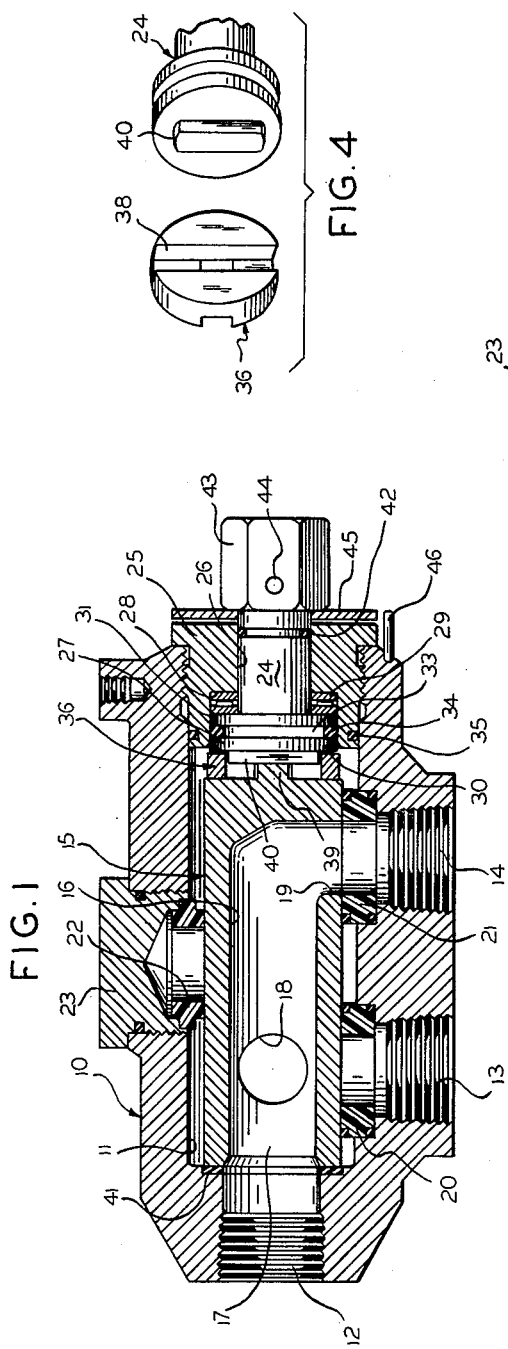

3,165,122
PLUG VALVE
Norman H. Sachnik, Houston, Tex., assignor to
Texsteam Corporation
Filed Nov. 6, 1962, Ser. No. 235,636
5 Claims. (Cl. 137—625.47)

This invention relates in general to a plug valve, and more particularly to a plug valve capable of operating as a three-way valve.

The valve of the present invention is useful to control the movement of high pressurized fluid, such as oil, gas, mud, air, steam, foods, acids, cement and other liquids, gases and slurries, and includes generally an elongated body having an inlet port at one end and one or more outlet ports along the side and a plug rotatable therein. The plug includes a passageway extending therethrough with the inlet opening of the passageway at the end of the plug and in constant communication with the inlet port of the body, and one or more outlet openings along the side of the plug and in selective communication with an outlet port, and serves to control operation of the valve and selectively intercommunicate the inlet port with an outlet port. Rotation of the plug is accomplished by a stem rotatably mounted in the body in coaxial driving relationship with the plug and at the end opposite the inlet port. The stem further supports the plug against longitudinal movement within the body away from the inlet port. A thrust bearing is associated with the stem to absorb the thrust forces introduced by action of the pressurized fluid entering the inlet port and contacting the plug and seal ahead of the bearing thereby assuring ease in rotation of the plug and stem at all times. Resilient seats are provided for assuring positive seal between the outlet ports and the outlet openings of the plug, and to positively seal the inlet fluid from an outlet port which has the plug closed to that port. The stem may be rotated or operated by an actuator of any desirable type or an ordinary hand wrench.

It is therefore an object of this invention to provide an improved plug valve for use with manifolds, test headers, and in-line locations to control movement of high pressure fluids.

Another object of this invention is in the provision of an improved three-way plug valve that is small and compact in construction, and which has a low pressure drop for its size.

Another object of this invention is to provide a three-way plug valve, wherein less torque is required to operate the valve, and wherein all of the ports are in one plane and the outlet ports are parallel, thereby simplifying manifold design and arrangement.

A still further object of this invention is in the provision of a three-way plug valve that may be operated manually or mechanically, and wherein a rotary stem is provided with a roller thrust bearing that eliminates the problems normally associated with globe type valves.

Still another object of this invention resides in the provision of a three-way plug valve including a stem for operating the plug and controlling the flow of fluid through the valve, wherein the stem is exposed to the scaling and corrosive environment of the fluid, but is not forced to slide through a packing set, thereby minimizing sticking and leakage and providing more reliable valve operation.

A further object of the present invention is in the provision of a three-way plug valve that can be repaired "in-the-line," since the seats and plug are removable.

A still further object of this invention resides in the provision of a three-way port valve that is "non-lubricated," thereby reducing maintenance and further eliminates the possible contaminations of the fluid passing through the valve with a valve lubricant.

Other objects, features and advantages of the invention will be apparent from the following detailed disclosure taken in conjunction with the accompanying sheet of drawings, wherein like reference numerals refer to like parts, in which:

FIG. 1 is a longitudinal sectional view taken through the valve of the present invention;

FIG. 2 is a perspective view of the valve according to the present invention;

FIG. 3 is a perspective view of the driven end of the plug and the mating end of the equalizing ring; and FIG. 4 is a perspective view of the driving end of the stem and the mating end of the equalizing ring.

Referring now to the drawings, the valve of the present invention includes an elongated hollow body 10 having an elongated hollow bore 11, an inlet port 12 at one end of the body, and outlet ports 13 and 14 along one side of the body. All of the ports are suitably tapped for receiving threaded pipe or couplings and are in one plane. Moreover, the outlet ports 13 and 14 are parallel to each other. While a pair of outlet ports are shown in the preferred embodiment, it should be appreciated that one or more outlet ports may be provided, depending upon the desires of the user.

Communication between the inlet 12 and the outlet ports 13 and 14 is controlled by a plug 15, preferably cylindrical in shape, and rotatably mounted within the body 10, and within a hollow bore 11. It may be noted that the exterior diameter of the plug is somewhat smaller than the interior diameter of the bore 11. A passageway 16 extends through the plug 15 and opens at one end to the inlet port 12 by means of an inlet opening 17. A pair of staggered outlet openings 18 and 19 are positioned along the side of the plug for selective communication with the outlet ports 13 and 14, and so both outlet ports may be closed by the plug at the same time. If a single outlet port is provided, only one outlet opening is needed. The inlet opening 17 is in constant registry with the inlet port 12 while the outlet openings 18 and 19 are in selective registry with the outlet ports 13 and 14 depending upon the position of the plug 15.

Annular valve seats 20 and 21 are arranged between the plug 15 and the outlet ports 13 and 14, respectively, to provide an effective seal between the plug and the ports. Preferably, the seats are made of resilient material such as synthetic rubber or plastic so that positive seals are provided. The seats are received in recesses formed about the inner ends of the outlet ports and are held in place in this manner. Moreover, the seats provide a bearing surface for the plug during its rotational movement in the valve. Further bearing surface is provided by an annular guide seat 22 arranged diametrically opposite the outlet port seats 20 and 21. Preferably the guide seat 22 may be made of a plastic material, such as phenolic. The guide seat 22 is held in place by a removable guide nut 23 that is threadedly mounted on the body in a suitable threaded opening.

Rotation of the plug is accomplished by means of a stem 24 mounted at the end of the body 10 opposite the inlet port and held in place by a nut 25 threadedly received in the open end of the bore 11, and having a bore 26 through which the main part of the stem extends to the outside of the body. The nut 25 is provided with an enlarged bore 27 inwardly of the bore 26 and which defines with the bore 26 an abutment or shoulder 28 against which a thrust bearing 29 is mounted. The stem 24 is enlarged at one end to define a pair of spaced collars 30 and 31 received within the enlarged bore 27 and of a slightly smaller diameter thereof. The collar 31 abuts against the thrust bearing 29. An annular groove 33 is provided in the enlarged portion 30 for receiving an O-ring gasket 34 to seal along the bore 27 and the stem 24. The stem nut 25 is sealed along its external diameter with the bore 11 by means of an O-ring seal 35.

The stem 24 is connected to the plug 15 by means of a coupling including an equalizer ring 36 having perpendicularly arranged slots or keyways 37 and 38 on opposite faces thereof. A blade or driven lug 39 extends from the plug 15 and into engagement with the slot 37 of the equalizing ring, while a blade or driving lug 40 extends from the stem 24 and into engagement with the slot 38 of the equalizing ring. Thus, the equalizing ring transmits motion from the stem to the plug, while at the same time accepting centerline misalignment of the centerlines of the plug and stem due to the blade-slot connections, thereby freeing the plug so that it may align with the outlet port seats 20 and 21. Moreover, the slots are of such depth that the blades 39 and 40 abut against each other so that the stem placement positions the plug and thrust forces against the plug are transmitted through the stem to the thrust bearing 29. Actually, the stem is sized to hold the plug against a plug support washer 41 arranged at the inlet port end of the body and mounted concentric with the port. Thus a certain amount of clearance results between the plug and the washer 41 so as to align the plug longitudinally with the outlet ports. The clearance is in a minimum amount but is sufficient to prevent binding due to thermal expansion of the internal parts and the external valve body.

A dirt seal 42 is arranged along the stem 24 and the nut bore 26 to prevent dirt from entering the body and bearing 29.

A wrench nut 43 is connected to the outer end of the stem 24 by means of a pin 44. Thus the valve may be operated by applying a hand wrench to the wrench nut 43. Alternately, an actuator may be connected to the outer end of the stem if so desired. In order to determine the position of the plug, an indicator plate 45 is connected to the wrench nut 43 for corotation therewith and includes various suitable indicia inscribed thereon. This indicia coacts with an indicator pin 46 fixed to the body to indicate the position of the plug and condition of the valve.

It will be understood that modifications and variations may be effected without departing from the scope of the novel concepts of the present invention, but it is understood that this application is to be limited only by the scope of the appended claims.

The invention is hereby claimed as follows.

1. A plug valve comprising, an elongated hollow body having an inlet port at one end thereof and a pair of longitudinally spaced and aligned outlet ports along the side thereof, an elongated plug rotatable in said body and having a passageway therein with an inlet opening at one end thereof registering at all times with said inlet port and a pair of staggered outlet openings along the side thereof selectively registering with said outlet ports, a stem rotatably carried in the body at the end thereof opposite the inlet port and in coupling engagement with said plug for corotation therewith and to support said plug against longitudinal movement within the body away from said inlet port, resilient seats at said outlet ports coacting with said plug to define a positive seal, a guide seat within said body diametrically opposite said outlet ports coacting with said resilient seats to support said plug within the body, and a thrust bearing carried by the body and in engagement with said stem to receive the thrust of said plug, said stem extending outwardly of said body.

2. The plug valve of claim 1, wherein all of said ports are in one plane and the axes of the outlet ports are parallel.

3. A plug valve comprising, an elongated hollow body having an inlet port at one end thereof and a pair of longitudinally spaced and aligned outlet ports along the side thereof, an elongated plug rotatable in said body and having a passageway therein with an inlet opening at one end thereof registering at all times with said inlet port and a pair of staggered outlet openings along the side thereof selectively registering with said outlet ports, a stem rotatably carried in said body at the end thereof opposite the inlet port and having diametrically extending coupling means facing said plug, diametrically extending coupling means on said plug facing said stem, an equalizer ring adapted to compensate for misalignment between said plug and stem and to transmit rotary motion from the stem to the plug, said ring having means on opposite faces thereof receiving said coupling means, said stem through said equalizer ring supporting said plug against longitudinal movement, and a thrust bearing carried by the body and in engagement with said stem to receive the thrust of said plug.

4. The plug valve of claim 3, and resilient seats at said outlet ports coacting with said plug to define a positive seal.

5. The plug valve of claim 3, and stationary resilient seats at said outlet ports coacting with said plug to define a positive seal, and a guide seat within said body diametrically opposite said resilient seats coacting therewith to support said plug within said body.

References Cited in the file of this patent

UNITED STATES PATENTS

| | | |
|---|---|---|
| 1,224,090 | Lavigne | Apr. 24, 1917 |
| 1,791,914 | Tomlinson | Feb. 10, 1931 |
| 2,319,347 | Reed | May 18, 1943 |
| 2,436,680 | Straussler | Feb. 24, 1948 |
| 2,503,639 | Snyder | Apr. 11, 1950 |
| 2,621,886 | Mueller | Dec. 16, 1952 |
| 2,698,731 | Koehler et al. | Jan. 4, 1955 |
| 2,858,098 | Sanctuary | Oct. 28, 1958 |
| 3,051,190 | Milleville | Aug. 28, 1962 |

FOREIGN PATENTS

| | | |
|---|---|---|
| 1,096,137 | Germany | Dec. 29, 1960 |